United States Patent [19]

Gray, Jr.

[11] Patent Number: 5,887,674
[45] Date of Patent: Mar. 30, 1999

[54] CONTINUOUSLY SMOOTH TRANSMISSION

[75] Inventor: Charles L. Gray, Jr., Pinckney, Mich.

[73] Assignee: The United States of America as represented by the Administrator of the U.S. Environmental Protection Agency, Washington, D.C.

[21] Appl. No.: 540,760

[22] Filed: Oct. 11, 1995

[51] Int. Cl.$^6$ .................................................. B60K 7/00
[52] U.S. Cl. .......................................... 180/307; 180/308
[58] Field of Search .................................... 180/305, 307, 180/308, 197; 60/413, 490, 491, 492

[56] References Cited

U.S. PATENT DOCUMENTS

| | | | |
|---|---|---|---|
| 1,349,924 | 8/1920 | Swanson | 180/305 |
| 3,637,036 | 1/1972 | Swisher, Jr. et al. | 180/307 |
| 3,892,283 | 7/1975 | Johnson | 180/307 |
| 4,140,196 | 2/1979 | Brewer | 180/307 |
| 4,441,573 | 4/1984 | Carman et al. | 60/413 |
| 5,062,498 | 11/1991 | Tobias | 60/413 |
| 5,201,570 | 4/1993 | Heren et al. | 180/197 |

FOREIGN PATENT DOCUMENTS

673480  7/1979  U.S.S.R. ................................. 180/305

*Primary Examiner*—Brian L. Johnson
*Assistant Examiner*—Frank Vanaman
*Attorney, Agent, or Firm*—Lorusso & Loud

[57] ABSTRACT

A drive train for a vehicle having front and rear wheels includes a fluidic motor and a pump interconnected in a continuous loop, with one conduit connected to the inlet of the fluidic motor to the outlet of the pump and a second conduit connecting the inlet of the pump to the outlet of the fluidic motor. A gas/liquid fluid accumulator is in fluid communication with the first conduit and a low pressure reservoir is in fluid communication with the second conduit. An engine, sized to match the average torque demanded of the vehicle, is employed to drive the pump. Sensors are included for detecting the pressure within the accumulator and the power demanded of the vehicle by the driver and, optionally, vehicle speed. A motor controller controls displacement of the fluidic motor in accordance with the sensed power demand and a pump controller controls displacement of the pump responsive to the signal for detected pressure.

8 Claims, 6 Drawing Sheets

CONTINUOUSLY SMOOTH TRANSMISSION

BACKGROUND OF THE INVENTION

1. Field of the Invention:

The field of the invention is in motor vehicle transmissions providing increased fuel energy utilization efficiency.

2. The Prior Art:

Conventional transmissions used in motor vehicles transmit torque from the engine to the wheels by two means: (1) the predominant torque transfer is "pass through", i.e., in response to the driver's command for more power, the flow rate of fuel is increased to the engine, the engine's torque is increased and the increased torque is "passed through" to the wheels (see Mode 1 for a typical engine torque map—line "X" shown in FIG. 1); and (2) when the driver's command for more power exceeds what the engine can supply at its initial speed, the driver must shift the transmission to a lower gear (either manually or by triggering the shift in an "automatic" transmission) to increase the engine's speed (see Mode 2—line "Y" in FIG. 1, for example). Since power to the wheels at a given vehicle speed is proportional to engine torque times engine speed, power to the wheels is increased by either increasing engine torque (fuel flow rate at a given engine speed) and/or by increasing engine speed. There are two principal disadvantages of such transmissions: (1) the engine is usually operating in Mode 1 and thus supplies torque at an average efficiency much less than the optimum available (e.g., in FIG. 1 point A represents an average value while point B represents the optimum available efficiency at that speed); and (2) when a change of gear is needed, there is an interruption in the supply of torque to the wheels, manifested as a "jerk". Automatic transmissions smooth this "jerk" through a torque converter; however, increased inefficiency is the result.

Much work has been devoted to replacing conventional transmissions and their inherent disadvantages. This work has focused largely on continuously variable transmissions (CVTs). Ideally, with a CVT an engine would operate along line "Z", the optimum efficiency line as shown on FIG. 1. CVT designs include is mechanical (e.g., variable ratio pulleys), electric (an electric generator driven by the engine "powers" an electric motor connected to the wheels—modern train locomotives utilize this design) and hydraulic which operates much like the electric design. These designs offer some improvements but still rely on Mode 1 (line "X" in FIG. 1—increased fuel rate at a given speed or, more generally when speed is changing, increased fuel rate per combustion event), as the means of increasing engine speed to increase power to the wheels. However, operation along the optimum torque curve shown as line "Z" in FIG. 1, leaves little remaining torque available above this optimum for rapidly increasing the speed of the engine (i.e., accelerating the rotating mass of the engine while overcoming increased friction) to quickly respond to the driver's command for increased power to the wheels. Rapid power response is a critical vehicle performance characteristic from a driver/customer's perspective.

There are two options currently recognized as improving the response of a CVT. The first option initially reduces the torque available to the wheels and applies this torque to accelerating the engine to the needed increased speed. However, this first option is commercially unacceptable because it results, not just in hesitation, but in an actual loss of power to the wheels, completely contrary to the driver's command for more. The second option reduces the standard operating curve downward from optimum so that more torque is available for Mode 1 function (See line "W" in FIG. 1), therefore resulting in a further efficiency trade-off while still not achieving the power response of conventional transmissions that can fully utilize both Mode 1 and Mode 2.

SUMMARY OF THE INVENTION

Accordingly, it is an object of the present invention to provide a third option that not only totally solves the power response constraint of conventional CVT designs, but also does so without the necessity of increasing engine torque (Mode 1) for the needed engine speed increase, and without the associated inefficiencies.

Another object is to provide a power train for a vehicle which reduces emissions of $NO_x$, $CO_2$ and other pollutants from motor vehicles.

Still another object of the present invention is to provide a continuously variable transmission which both: (1) gives a continuous, smooth and rapid response to a driver command for an increase in power to the wheels; and (2) does so without the necessity of utilizing increased engine torque (and thus fuel consumption per engine combustion cycle) to increase engine speed, such increased engine speed being required to satisfy the new, increased power level required at the wheels.

Yet another object of the present invention is to satisfy the above objectives while allowing for engine operation maintained at or near the optimum efficiency curve for the engine.

Still another object is to provide the above functions by initially reducing the power supplied by the engine to the wheels, while still providing increased power to the wheels in response to the driver's command.

A further object is to utilize multiple drive motors and, for hybrid applications, multiple generators (pumps), to maximize drive train efficiency.

With a view toward realization of the above objects, the present invention provides a drive train for a vehicle which has front and rear wheels wherein the drive train has at least one fluidic motor and one pump interconnected in a fluid loop with one conduit connecting the outlet of the pump to the inlet of the fluidic motor and a second conduit connecting the outlet of the fluidic motor to the inlet of the pump. A smaller than conventional engine, sized in accordance with the average torque demand on the vehicle, serves to drive the one pump. A fluid accumulator, containing pressurized gas and a quantity of the hydraulic fluid of the loop, is in communication with the first conduit and a liquid reservoir is in fluid communication with the second conduit. A pressure detector is provided for detecting the fluid pressure within the accumulator and for generating a pressure signal representative of the detected pressure. Power demand is sensed by a sensor which detects position of the accelerator pedal or position of the throttle as an indication of the power demanded of the vehicle by the driver. A motor controller controls displacement of a fluidic motor in accordance with sensed power demand and a pump controller controls displacement of the pump responsive to the pressure signal.

An electronic control unit (ECU) receives signals representative of the vehicle speed, accumulator pressure and power demanded by the driver and outputs control signals to the pump controller and the motor controller to govern the displacements thereof. In an embodiment employing plural fluidic motors, the ECU also functions to select for operation a fluidic motor displacement or combination of different displacements for different motors best suited for the detected vehicle power demand.

DESCRIPTION OF THE PREFERRED EMBODIMENTS

Figures 2, 3:
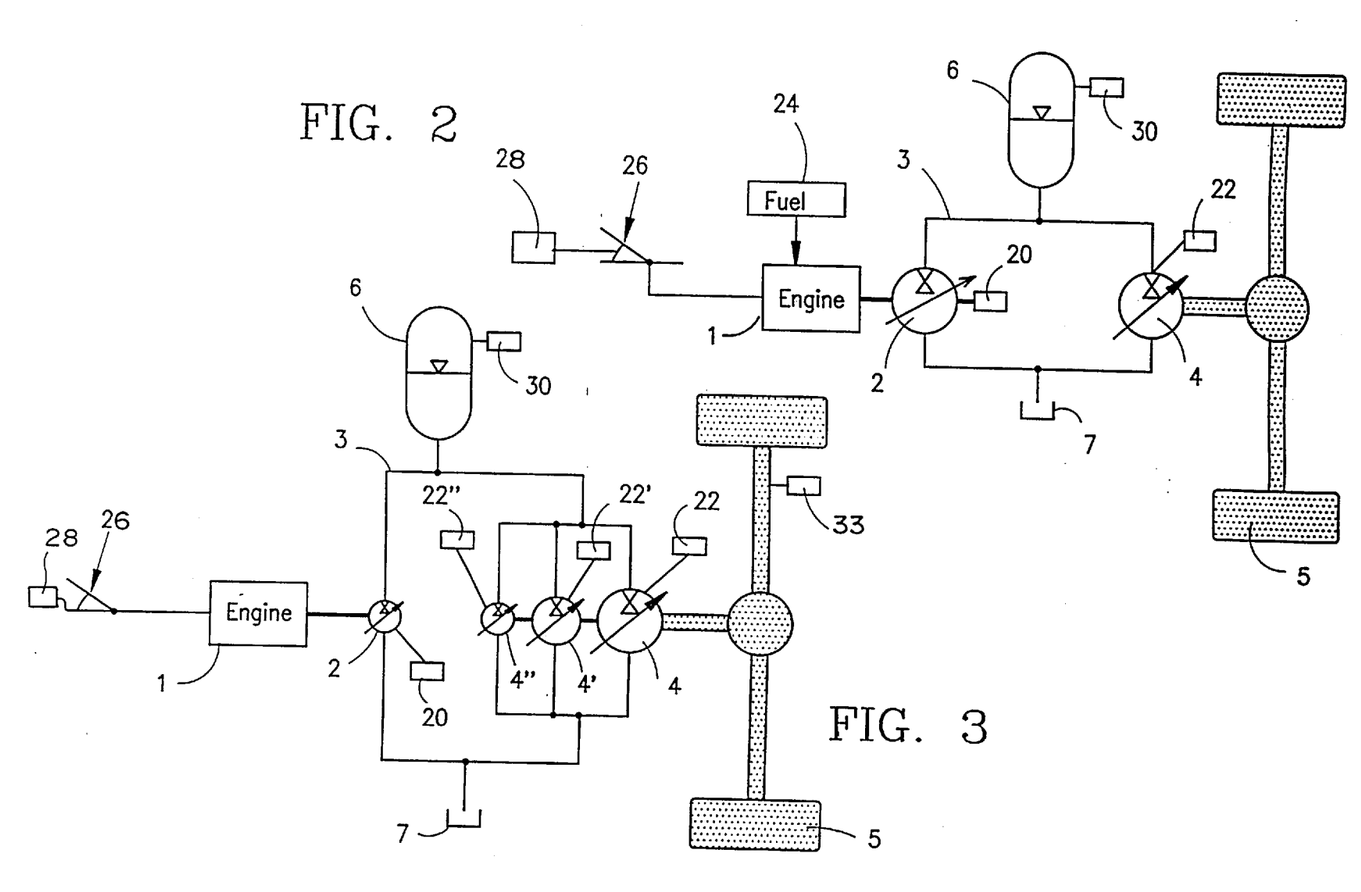
FIG. 2 is a schematic diagram of a drive train in accordance with a first embodiment of the present invention.
FIG. 3 is a schematic diagram of a second embodiment of the drive train of the present invention.

FIG. 2 shows a first preferred embodiment wherein a hydraulic CVT is combined with an accumulator, to provide a hydraulic, continuously smooth transmission (hereinafter "CST"). An engine 1 delivers power to a hydraulic pump 2 which, in turn, delivers a flow of pressurized hydraulic fluid through line 3 to a hydraulic motor 4. The hydraulic motor 4 transforms the hydraulic power to torque which is supplied to the wheels 5. An accumulator 6 is also connected to line 3 and serves as an additional source of supply of a flow of pressurized hydraulic fluid to the hydraulic motor 4. The accumulator 6 contains a volume of gas and, as hydraulic fluid is pumped into accumulator 6, the pressure of the gas increases and energy is stored. When this stored energy is needed, the hydraulic fluid is allowed to exit the accumulator 6 and supply power to the hydraulic motor 4. Since the exiting flow of hydraulic fluid from the accumulator 6 can be at a very high rate, the accumulator may be sized to store only a small quantity of energy, and this energy may be supplied in a very short period of time. Therefore, the system may be considered a high power device. A low pressure hydraulic fluid reservoir 7 supplies fluid when accumulator 6 is being charged, and stores fluid when accumulator 6 is supplying power to the hydraulic motor.

Referring again to FIG. 1, if a vehicle's engine is operating at point C and the driver issues a command for power to the wheels corresponding to point D, i.e., depresses the accelerator pedal 26 (FIG. 2), the displacement of the hydraulic motor 4 is increased by motor controller 22 to increase power to the wheels 5 to the level corresponding to point D in FIG. 1. The greatly increased flow associated with the increased motor displacement can not be quickly supplied by the engine 1 (FIG. 2) until its speed is increased (the problem previously described) and, therefore, accumulator 6 supplies the increased hydraulic fluid flow while the engine speed is increasing. Thus, the CST delivers almost instantaneous response to the driver's request for power to the wheels while maintaining the optimum engine operating characteristics, i.e. while allowing the engine to continue running at peak efficiency. The accumulator 6 can be small, only large enough to "fill in" hydraulic fluid flow while the engine speed changes (usually less than five gallons and probably for most applications closer to one or two gallons).

Figure 9:
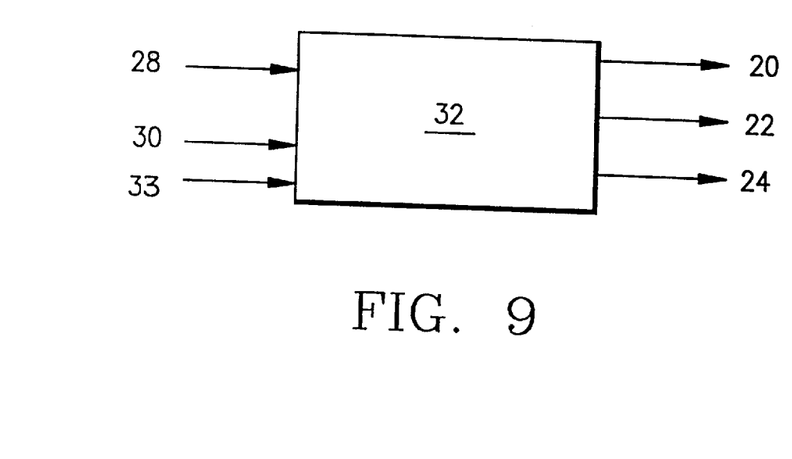
FIG. 9 is a schematic diagram of the electronic control unit of the present invention showing input signals and output signals.

In this preferred embodiment the pressure in accumulator 6 is monitored by a pressure sensor 30. The pressure sensor 30 and the accelerator pedal position sensor 28 (or a throttle position sensor) send signals to an ECU 32 (see FIG. 9) which in turn sends output signals for control of pump controller 20, motor controller 22 and fuel supply 24. Thus, the change in the pedal position detected by sensor 28 is correlated with the pressure of accumulator 6 detected by pressure sensor 30 to determine a new displacement setting for pump 2 and a signal is sent from ECU 32 to controller 22 to reset the displacement of motor 4 to the new value. An increase in the displacement of motor 4 (when an increased pedal depression is sensed) will result in a drop in the system pressure and in accumulator 6 and, accordingly, the ECU 32 sends a signal to pump controller 20 to decrease the displacement of pump 2 in accordance with the drop in pressure so that the speed of engine 1 will rapidly increase corresponding to the new power demand. When engine 1 reaches the appropriate speed, the ECU 32 sends a signal to pump controller 20 to increase the displacement of pump 2, satisfying the fluid power requirement and regaining the system set-point pressure.

The engine speed increase may be accomplished by one of or a combination of several means. The engine will automatically adjust to a drop in system pressure by increasing speed, thereby maintaining a substantially constant torque output. However, perhaps the most cost-effective means of increasing engine speed is to reduce the displacement of pump 2 by controller 20. The combination of the reduced pressure of the system associated with the increased flow through the motor 4 and the reduced displacement of pump 2 allows the engine output power to be shifted more to accelerating the engine. The power supplied to the system from engine 1 is directly proportional to the pump 2 displacement and system pressure. A similar cost-effective means of increasing the engine speed would be an engine "starter" motor (either electric or hydraulic) which, in combination with reduced system pressure, would rapidly accelerate the engine to the new, needed speed. Of course, the traditional means of increasing engine speed by increasing fuel rate (fuel quantity per combustion event) via 24 (Mode 1) could still be used, but would no longer be required.

Figure 1:
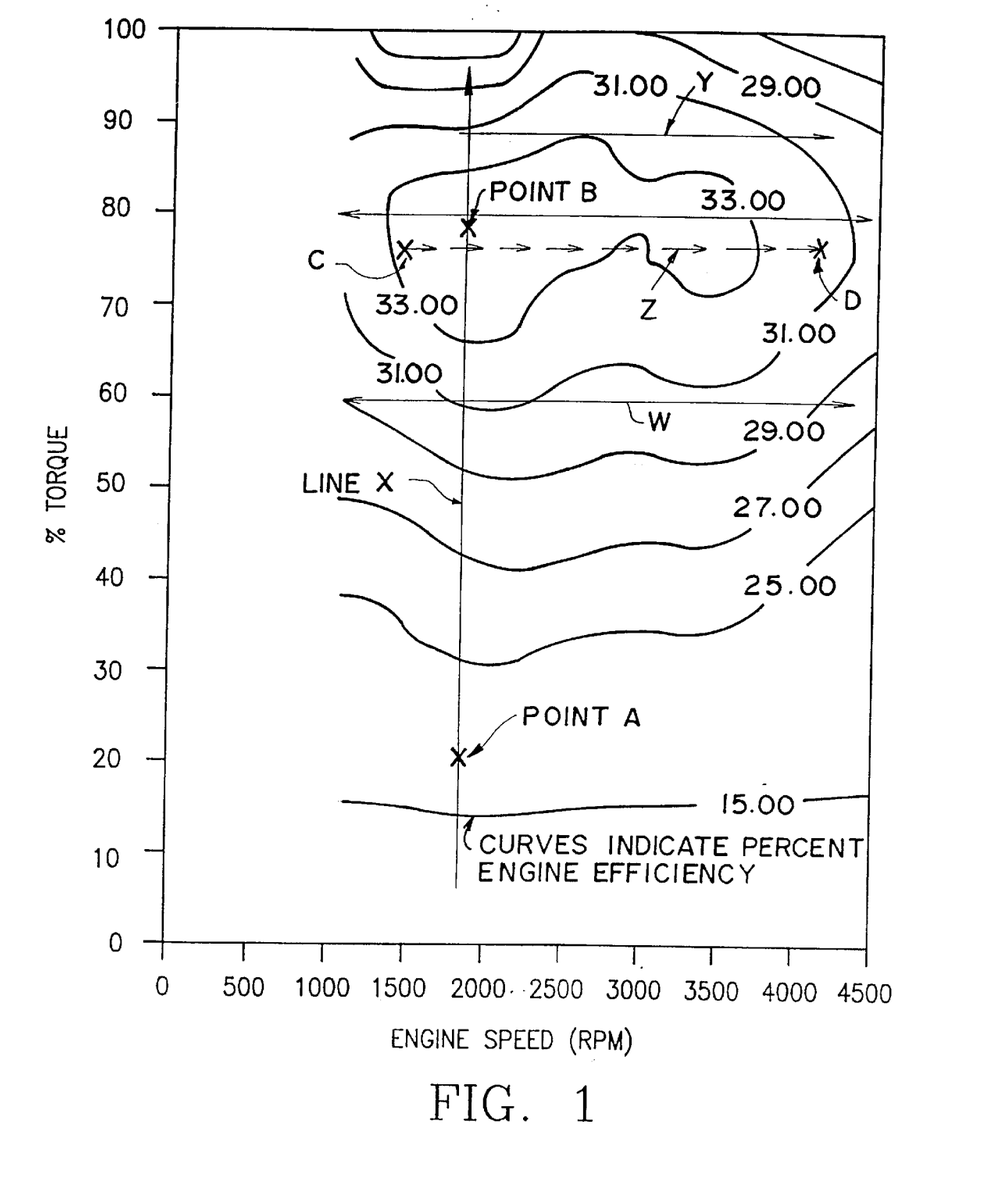
FIG. 1 is a graph of percentage of maximum engine torque versus engine speed for a typical engine, with curves showing percent fuel efficiency.

Power reduction, e.g., going from point D to point C in FIG. 1, is handled in a similar manner as power increases except for one important difference. As the displacement of motor 4 (FIG. 2) is reduced, system pressure increases which inherently "drives" the speed of the engine to the required, new lower level. There is, of course, no power response performance requirement for decreasing power demands.

In the subject invention the accumulator may be replaced with an equivalent high power device, e.g., an electric ultracapacitor in an electric drive transmission.

FIG. 3 illustrates a second preferred embodiment of the invention which is a variation of the embodiment described in FIG. 2. This second embodiment incorporates the concept of utilizing more than one hydraulic motor to optimize the efficiency of power delivery to the wheels, taking into consideration the extremely wide range of speed and power required at the wheels of motor vehicles. While a large motor is needed for rapid acceleration of the vehicle, such a large motor will not operate efficiently at the more common light accelerations and cruising modes of vehicle driving.

Figure 4:
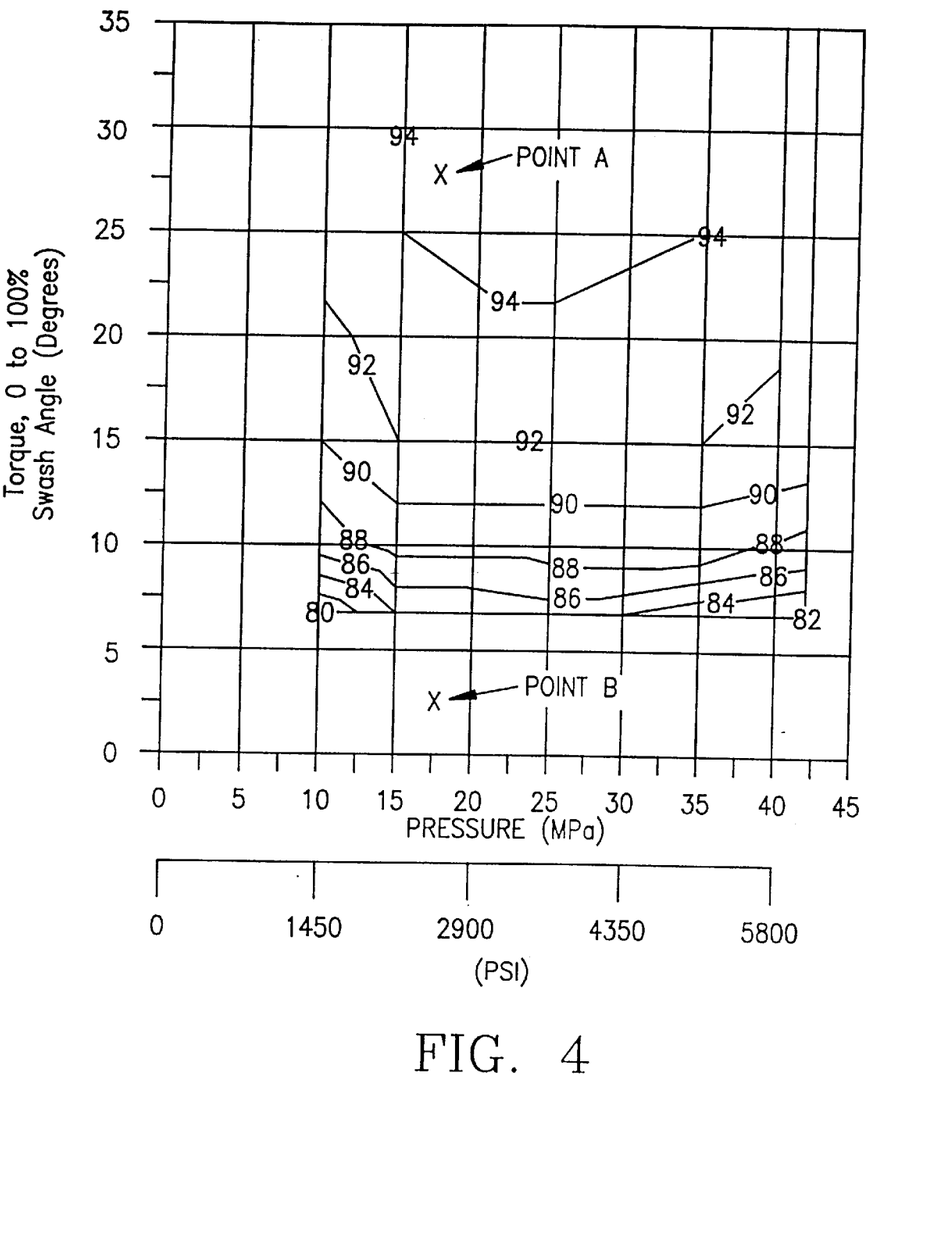
FIG. 4 is a graph of the swash angle of a typical pump or motor, which may be utilized as one component of the drive train of the present invention, versus operating pressure, with curves showing percent efficiency.

FIG. 4 shows percent efficiency on the operating map of a typical large hydraulic motor at a speed that would be geared to correspond to, for example, 50 miles per hour vehicle speed. Point A corresponds to the power level that might be required for a rapid passing maneuver while point B corresponds to a typical cruising road load. It is clear that in order to be able to satisfy the high power demand associated with a rapid acceleration, that the more common and thus highest energy consuming modes like point B would not be satisfied with highest efficiency from a single motor. Therefore, the variation shown in FIG. 3 allows the motor displacement control system to pick, from among motors 4, 4' and 4", responsive to driver power demand detected by accelerator pedal position sensor 28 and vehicle speed detected by speed sensor 33, that motor (or motors) having the size and displacement that most closely corresponds to the highest efficiency for the detected vehicle speed and power demand. The choice of the number of motors is based on an efficiency versus cost trade-off analysis.

Figure 5:
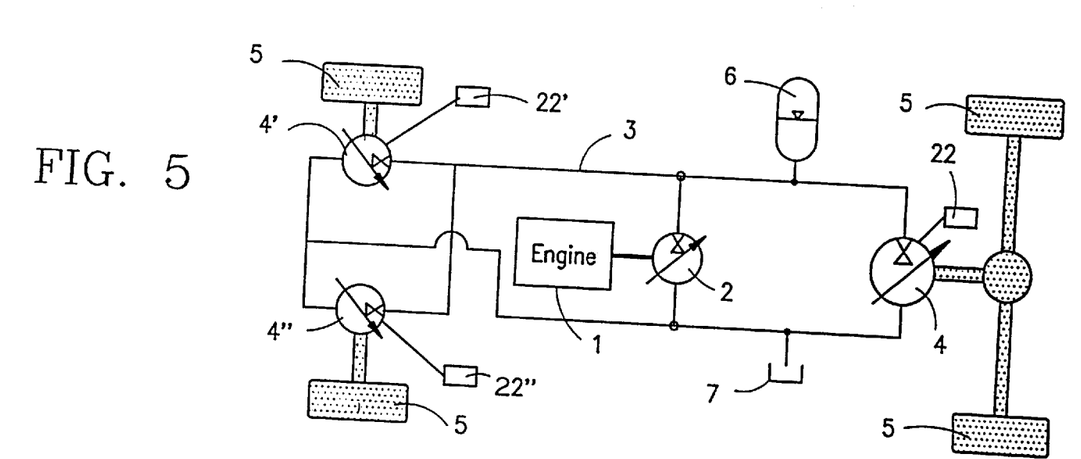
FIG. 5 is a schematic diagram of a third embodiment of the drive train of the present invention.
Figure 6:
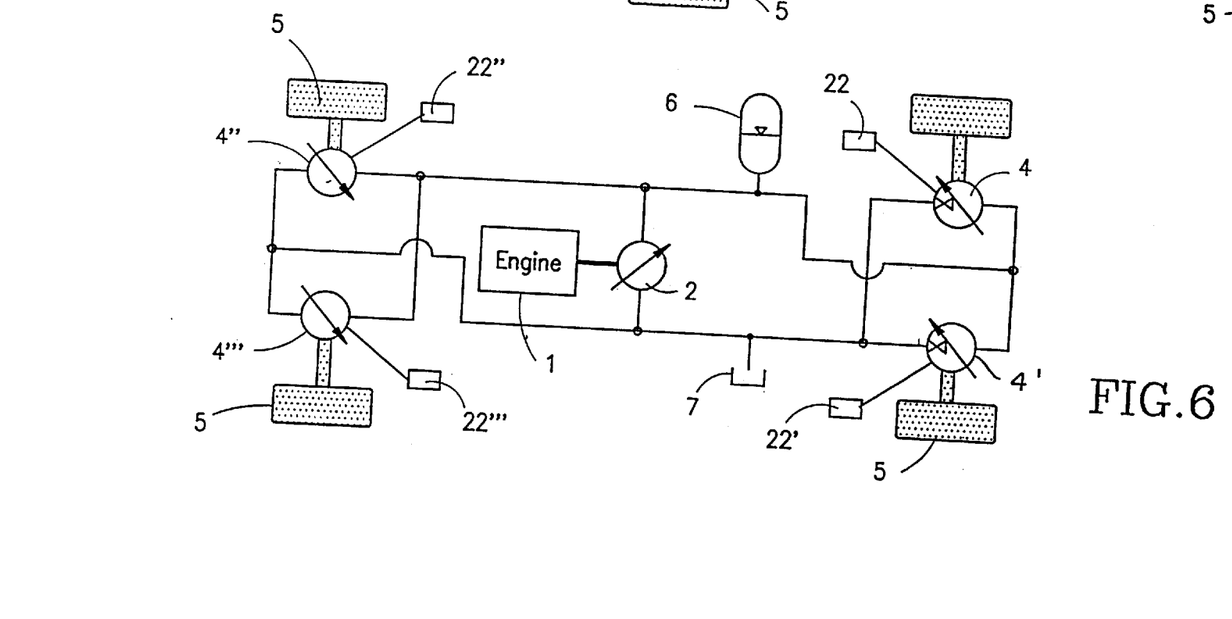
FIG. 6 is a schematic diagram of a fourth embodiment of the drive train of the present invention.

The use of multiple motors also allows low-cost direct wheel drives and low-cost 4-wheel direct drive. Individual motors can power each wheel (FIG. 6), or direct wheel drive and differential drive can be combined (FIG. 5). Thus, the embodiment of FIG. 5 includes motors 4, 4' and 4" and motor controllers 22, 22' and 22", while the embodiment of FIG. 6 includes motors 4, 4', 4" and 4'" and motor controller 22, 22', 22" and 22'".

Figures 7, 8:
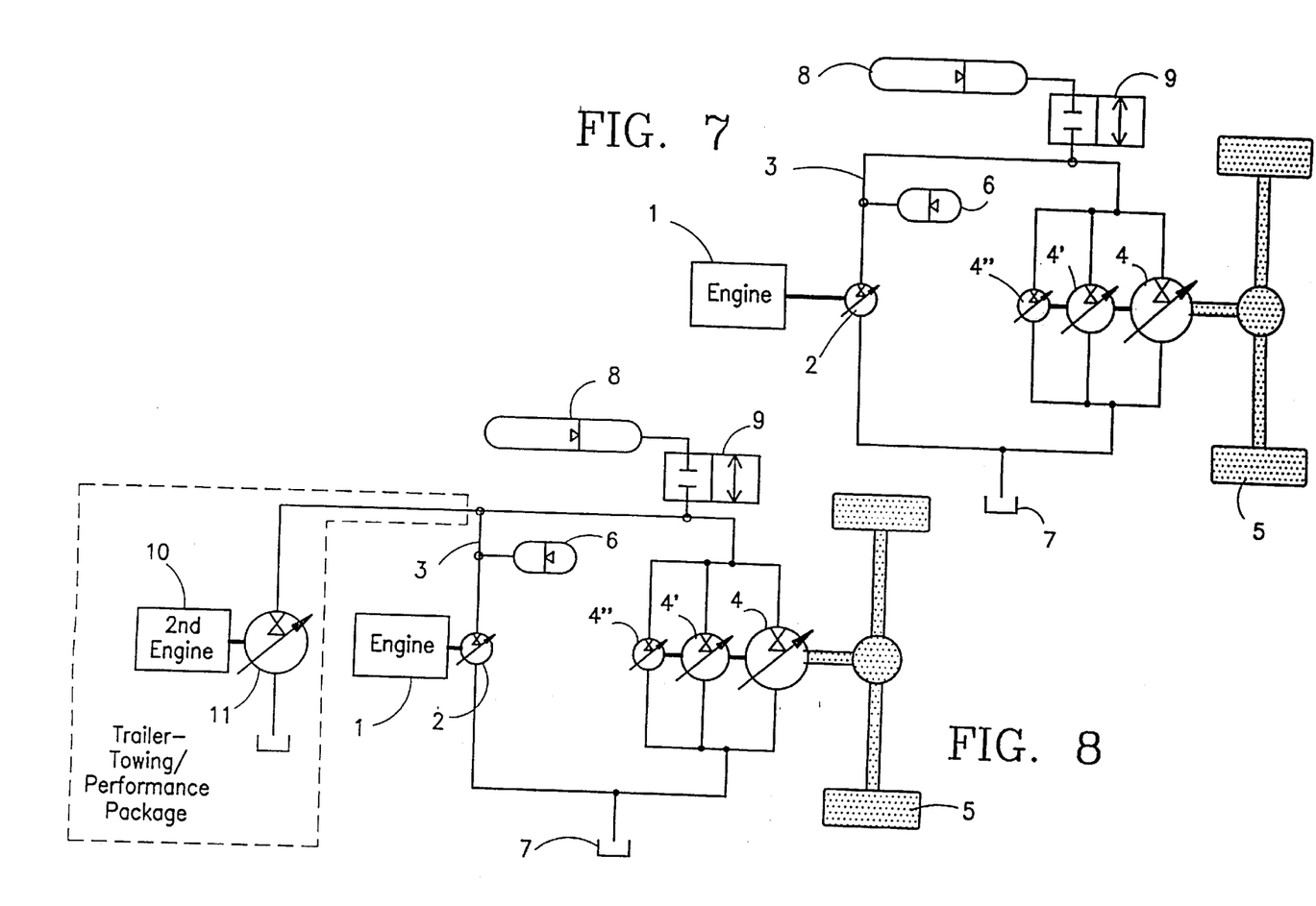
FIG. 7 is a schematic diagram of a fifth embodiment of the drive train of the present invention.
FIG. 8 is schematic diagram of a sixth embodiment of the drive train of the present invention.

FIG. 7 illustrates the major components of a fourth embodiment of the invention. FIG. 7 shows the CST integrated into a hydraulic hybrid propulsion system which incorporates regenerative braking in an efficient and low cost manner. The hydraulic motors 4, 4' and 4" can easily be operated as pumps by reversing the flow of hydraulic fluid to pump fluid from the low pressure reservoir 7 to the second accumulator 8, through flow control valve 9, thus recovering kinetic energy when braking the vehicle and storing it in accumulator 8 for later re-use, for example, for high power demands such as accelerations. Accumulator 8 is sized to be sufficient to store a full braking event plus whatever reserve is desired for further load-leveling and reduction in the size of engine 1. A variation on this embodiment would be the combination of the two accumulators into a single unit.

FIG. 8 illustrates a fifth embodiment which adds a second engine 10 and pump 11 for a trailer-towing option and/or to allow yet another reduction in size of engine 1. The closer engine 1 can be sized to the average power demand of the vehicle (e.g., 10 horse power) the more efficient on average and lower cost it will be.

The present invention allows a conventional vehicle to be fitted with a significantly smaller engine (e.g., 20–40% smaller) while still maintaining the same vehicle performance (i.e., acceleration and responsiveness) because it can always apply the maximum torque producible by the engine to the wheels as compared to a much lower, average value associated with conventional, limited gear transmissions.

The present invention is especially well suited for hybrid vehicle applications (i.e., vehicles which have two or more power supplies available for powering the vehicle). It has all the advantages of the conventional vehicle application, plus it allows the primary power supply to be sized even closer to the average power demand of the vehicle (as compared to the peak power demand required with a conventional vehicle), extracting much greater efficiency gains while maintaining the performance characteristics of a much larger engine (e.g., 20 horsepower rather than 120 horsepower).

The present invention allows operation at or near the maximum efficiency of the engine by causing the engine to supply the needed power through a rapid increase in speed and allows even a small engine to follow the torque demand of the driver through a rapid change in engine speed without hesitation or jerk in the transition to increased torque at the wheels, while not requiring an increase in fuel rate per combustion event. This feature further allows the use of a much simpler and therefore much lower cost engine fuel supply system wherein a constant or near constant quantity of fuel is supplied for each combustion event.

Thus, the present invention provides a continuously variable transmission (CVT) that is unique in its ability to transition to a greatly increased torque to the wheels without experiencing the conventional hesitation and/or jerk associated with the sudden engine speed change of "down shifting," experienced both in mechanical fixed gear "standard" transmissions and in conventional "automatic" transmissions.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed:

1. A drive train for a vehicle having front and rear wheels, comprising:

at least one fluidic motor, having an inlet and an outlet, for driving at least one of the wheels;

at least one pump for producing a flow of hydraulic fluid to drive said fluidic motor, said pump having an outlet connected by first conduit means to the inlet of said fluidic motor and an inlet connected by second conduit means to the outlet of said fluidic motor;

at least one engine for driving said one pump at a variable speed;

a fluid accumulator in fluid communication with said first conduit means and containing pressurized gas in a gas space and a quantity of the hydraulic fluid;

at least one fluid reservoir in fluid communication with said second conduit means;

a pressure detector for detecting pressure within said accumulator and for generating a pressure signal representative of said detected pressure;

power demand sensing means for sensing a power demand by a driver of the vehicle for acceleration or deceleration of the vehicle;

a motor controller for controlling displacement of said fluidic motor responsive to the sensed power demand and said pressure signal; and a pump controller for decreasing displacement of said pump responsive to a drop in the detected pressure indicated by said pressure signal, thereby increasing the speed of said one engine, and for increasing displacement of said pump when the engine speed increases to a predetermined value.

2. A drive train in accordance with claim 1 comprising:

a plurality of fluidic motors, each having a different capacity;

vehicle speed sensor means for detecting vehicle speed;

plural motor controllers, each motor controller controlling displacement of one of said plurality of fluidic motors; and computer means for receiving signals from said power demand sensing means, said pressure detector and said vehicle speed sensor, for selecting the displacement of at least one of said fluidic motors in accordance with received signals and for sending a control signal to the motor controller associated with said selected fluidic motor for operation in accordance with the sensed power demand and for sending a control signal to said pump controller for changing displacement of said pump responsive to said pressure signal.

3. A drive train in accordance with claim 2 wherein said plurality of fluidic motors are connected in parallel and each has an inlet connected to said first conduit means and an outlet connected to said second conduit means.

4. A drive train in accordance with claim 1 wherein said one fluidic motor drives a pair of the wheels and wherein said drive train further comprises second and third fluidic motors, each of said second and third fluidic motors driving a wheel other than said pair of wheels, and plural motor controllers, each motor controller controlling one of said fluidic motors responsive to the sensed power demand.

5. A drive train in accordance with claim 4 wherein each of said second and third fluidic motors has a capacity less than said one fluidic motor.

6. A drive train in accordance with claim 1 further comprising second, third and fourth fluidic motors, each of said fluidic motors driving one of the wheels, and a plurality of motor controllers, each of said motor controllers controlling displacement of one of said fluidic motors responsive to the sensed power demand.

7. A drive train in accordance with claim 1 further comprising a second pump and a second engine for driving said second pump, said second pump having an outlet in fluid communication with said first conduit means and an inlet in fluid communication with a second fluid reservoir, said one engine being sized to provide the average power demanded of the vehicle at high efficiency and said second engine being of a substantially greater size than said one engine.

8. A method for operating a hybrid vehicle having at least one combustion engine, a pump driven by said one engine, at least one fluidic motor mechanically connected to at least one drive wheel of the hybrid vehicle and having an inlet fluidically connected to an outlet of said pump and an outlet connected to an inlet of said pump to establish a loop of hydraulic fluid circulating therebetween, and a pressure accumulator in fluid communication with said loop, said method comprising:

detecting speed of the one engine;

detecting fluid pressure within the accumulator;

sensing power demand on the vehicle;

changing displacement of the one fluidic motor responsive to the sensed power demand and the detected fluid pressure to meet the power demand and to maintain at least a minimum pressure with the accumulator; and controlling displacement of said pump, responsive to the detected pressure, to maintain the detected engine speed within a range predetermined based on engine efficiency.

* * * * *